(12) United States Patent
Bourlon et al.

(10) Patent No.: US 7,441,408 B2
(45) Date of Patent: Oct. 28, 2008

(54) FIXING OF A BRAKE-FLUID RESERVOIR

(75) Inventors: Philippe Bourlon, Dammartin En Goele (FR); Daniel Grech, La Morlaye (FR)

(73) Assignee: Robert Bosch GmbH (DE)

( * ) Notice: Subject to any disclaimer, the term of this patent is extended or adjusted under 35 U.S.C. 154(b) by 223 days.

(21) Appl. No.: 11/606,592

(22) Filed: Nov. 30, 2006

(65) Prior Publication Data

US 2007/0125080 A1    Jun. 7, 2007

(30) Foreign Application Priority Data

Dec. 2, 2005    (FR) .................................. 05 12446

(51) Int. Cl.
*B60T 11/26*    (2006.01)
*F15B 7/08*    (2006.01)

(52) U.S. Cl. ....................................................... 60/585

(58) Field of Classification Search ................... 60/585, 60/586, 587, 588, 589
See application file for complete search history.

(56) References Cited

U.S. PATENT DOCUMENTS

| 5,031,405 | A | * | 7/1991 | Takahashi et al. | 60/585 |
| 5,743,093 | A | * | 4/1998 | Nakayoku et al. | 60/585 |
| 6,571,556 | B2 | * | 6/2003 | Shinohara et al. | 60/585 |
| 6,964,166 | B2 | * | 11/2005 | Sunohara et al. | 60/585 |

* cited by examiner

*Primary Examiner*—Thomas E Lazo
(74) *Attorney, Agent, or Firm*—Michael Best & Fredrich LLP

(57) ABSTRACT

The invention relates to a brake fluid reservoir comprising at least two lateral mounting lugs (10, 11) designed to be placed either side of a central mounting lug (20) of a brake master cylinder. Collinear holes (12, 13, 21) traverse these lugs and are designed to receive a mounting pin (3). The said lugs include at least one device for the axial immobilization of the mounting pin (3).

18 Claims, 2 Drawing Sheets

FIXING OF A BRAKE-FLUID RESERVOIR

BACKGROUND OF THE INVENTION

The invention relates to a reservoir and a system for mounting this reservoir on a support part. The invention is especially applicable to a brake fluid reservoir and the system for mounting it on a brake master cylinder.

In a motor vehicle braking system, a brake fluid reservoir is mounted on the upper portion of a brake master cylinder in order to provide a reserve of fluid with a view to compensating for any reduction in the volume of fluid in the hydraulic braking circuit of the vehicle. The brake master cylinder is itself mounted on a braking assistance servo which is controlled by the brake pedal.

There are various methods for mounting a reservoir on a brake master cylinder. In particular, some reservoirs are mounted using one or more mounting elements, such as pins or bolts, which pass through mounting lugs provided in the lower portion of the reservoir and mounting lugs which are provided on the upper portion of the brake master cylinder.

However, these mounting elements must be immobilized using, for example, nuts for the bolts. The fitting and removing of the reservoir therefore require tools and a certain amount of time.

SUMMARY OF THE INVENTION

The invention relates to a mounting system that facilitates the fitting and removing of the reservoir.

The invention therefore relates to a brake fluid reservoir comprising at least two lateral mounting lugs designed to be placed either side of a central mounting lug of a support device. These lateral lugs include two collinear holes designed to receive a mounting pin, itself designed to pass through a central lug of the support part. According to the invention, it is envisaged that the mounting lugs include at least one device for the axial immobilization of the pin.

Advantageously, it is in particular envisaged that the holes in the lateral lugs include wider sections located on the side of the faces of the lateral lugs which are designed to be in contact with the central lug of the support part. These wider sections are designed to confine the mounting pin placed in the said holes.

The invention also relates to a mounting device attaching the reservoir hereby designed. It includes a spring device pressing both on a lower face of the reservoir and designed to press on an upper face of the support part so as to move the reservoir away from the support part in a specific direction of movement. The pin placed in the said holes is then designed to have its ends placed inside the wider sections.

The depth of the wider sections measured along the axis of the holes is such that the sum of the depths of the wider sections in the two lateral lugs plus the distance between these two lateral lugs is greater than the length of the pin.

It is envisaged that each wider section is located at least on the side opposite to the said direction of movement in relation to the axis of the holes.

According to a beneficial embodiment of the inventive system, the spring device includes a spring washer placed between the reservoir and the support part.

In order to produce this embodiment, it can be envisaged that the reservoir include a stud located under the lower face of the reservoir and going into a hole in the support part and that the washer include a sleeve placed around the stud, the said sleeve ending in a deformable elastic flange which is designed to be in contact with the lower face of the reservoir.

The invention is more particularly applicable to the mounting of a brake fluid reservoir on a brake master cylinder. The support part is then a brake master cylinder including, on its upper portion, a central mounting lug located on the longitudinal axis of the master cylinder.

In such an application, it can be envisaged that the said washer be placed around a reservoir outlet and around a brake master cylinder inlet.

BRIEF DESCRIPTION OF THE DRAWINGS

The various objectives and features of the invention will emerge more clearly from the description which follows and from the accompanying figures in which.

DETAILED DESCRIPTION

Figure 1A:
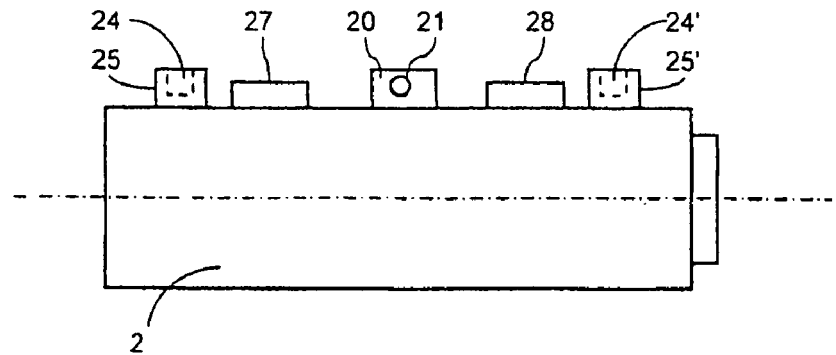
FIGS. 1a to 1c illustrate a simplified embodiment of a system according to the invention.
Figure 1B:
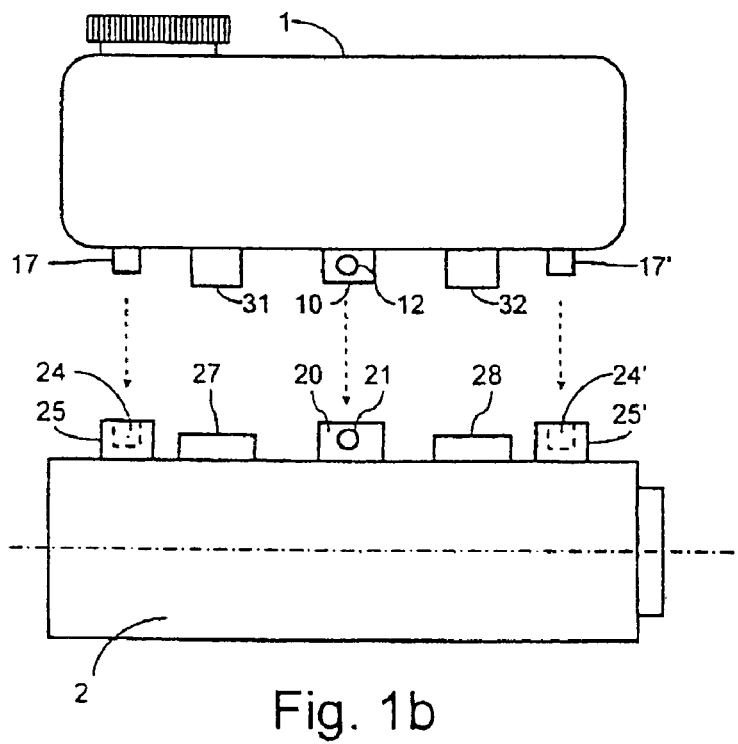
Figure 1C:
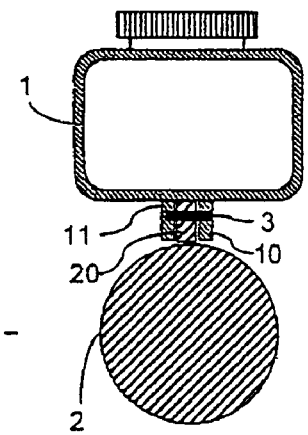

With reference to FIGS. 1a to 1c, a simplified embodiment according to the invention will first be described.

FIG. 1a illustrates a brake master cylinder allowing the invention to be used. This master cylinder 2 includes two inlets 27 and 28 for connecting with the inside of the master cylinder and introducing brake fluid with a view to filling the vehicle's hydraulic braking circuit. A mounting lug 20 including a hole 21 is provided in the upper portion of the master cylinder. Studs 25, 25' including blind holes 24, 24' are also provided, the use of which will be explained later.

The lower portion of FIG. 1b illustrates a brake master cylinder 2 such as the one in FIG. 1a and the upper portion of FIG. 1b illustrates a brake fluid reservoir 1 designed to be mounted on the master cylinder 2.

The reservoir 1 includes outlets 31 and 32 designed to be fitted into the inlets 27 and 28 of the brake master cylinder so as to connect the inside of the reservoir with the inside of the master cylinder. Two mounting lugs 10 and 11 provided on the lower portion of the reservoir are designed to be placed either side of the master cylinder central mounting lug 20 as illustrated in FIG. 1c. Two studs 17 and 17' are also provided on the lower portion of the reservoir and are designed to fit into the holes 24, 24' in the studs 25, 25' on the master cylinder.

As indicated by the dotted-line arrows on FIG. 1b, the reservoir 1 is placed on the brake master cylinder 2 so as to obtain the assembly in FIG. 1c.

The holes, such as the hole 12, in the reservoir lugs are aligned with the hole 21 in the lug 20 of the master cylinder and a pin is inserted in these holes (see FIG. 1c).

Figure 2A:
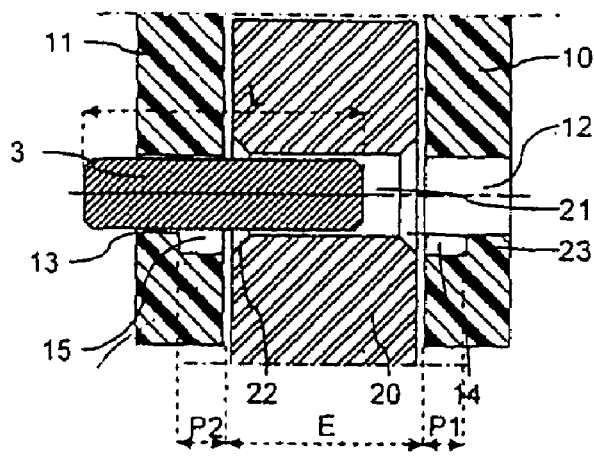
FIGS. 2a to 2c illustrate a detailed embodiment of a mounting system according to the invention.
Figure 2B:
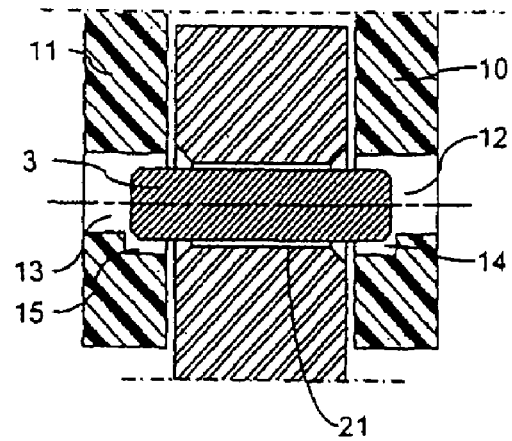
Figure 2C:
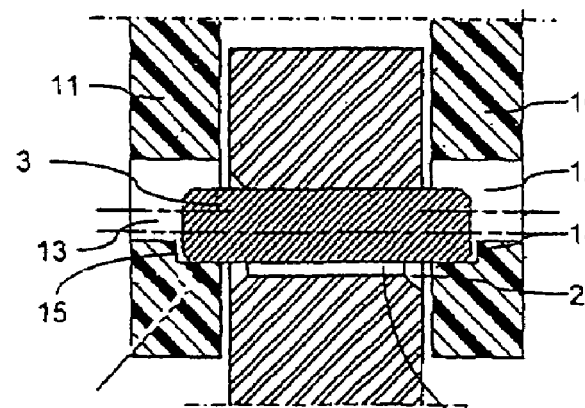

FIGS. 2a to 2c illustrate a method for mounting a reservoir on a brake master cylinder using a pin.

In these figures is shown the master cylinder central lug 20 and the lateral lugs 10 and 11 of the reservoir disposed on either side of the lug 20. The holes 12 and 13 in the lugs 10 and 11 and 21 in the lug 20 are put essentially into alignment.

The holes 12 and 13 include wider sections 14 and 15 located toward the faces of the lugs 10 and 11 which are near or even in contact with the central lug 20.

In FIG. 2a, a pin 3 is engaged in the holes 13 and 21.

In FIG. 2b, the pin is put in place at the center of the device.

In FIG. 2c, the lateral lugs 10 and 11 (that is to say the reservoir) have been displaced upward in the direction of the arrow F. The pin is then located in the wider sections 14 and 15 of the holes in the lugs 10 and 11, and the pin cannot come out of the holes in which it has been placed.

The length L of the pin is less than the sum of the depths P1 and P2 of the wider sections plus the distance E separating the two lugs 10 and 11.

It should be noted that, in order to facilitate the insertion of the pin in the hole 21 in the lug 20, the ends of the hole 20 are countersunk, at an angle of 45° for example, so that the pin can be put in place even if the hole 21 is not perfectly in alignment with the holes 12 and 13.

Figure 3A:
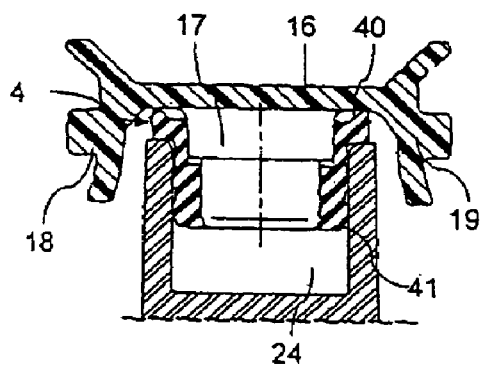
FIGS. 3a and 3b illustrate an example of a spring device for rendering the system in FIGS. 2a to 2c operational.
Figure 3B:
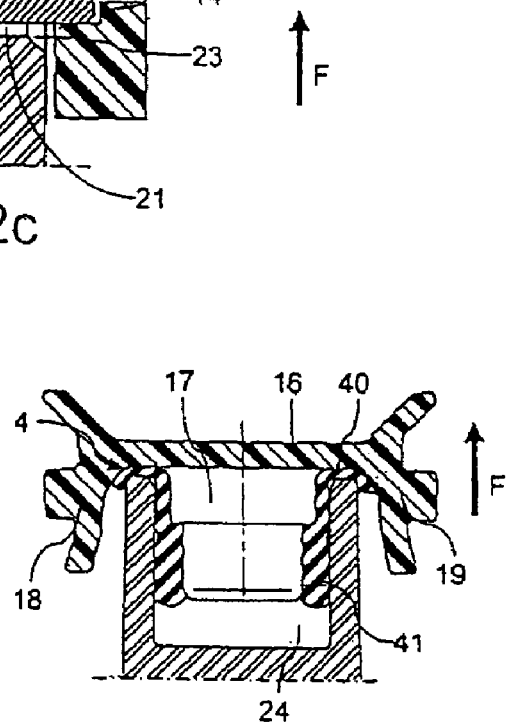

FIGS. 3a and 3b illustrate a system making it possible to push the reservoir 1 in the direction of the arrow F. The studs 17 and 17' (FIG. 1b) are fitted with sleeves made of elastic material. Thus in FIG. 3a, a seal 4 generally cylindrical in shape having a sleeve 40 which is placed around the stud 17. This sleeve has at its upper portion an elastic flange 40.

During the fitting of the reservoir on the brake master cylinder, the studs such as 17 are inserted in the holes such as 24 in the master cylinder. We therefore have the situation illustrated in FIG. 3a.

The upper flange 40 of the sleeve 4 has at its upper portion, a larger diameter so that by pressing on the reservoir in the opposite direction to the arrow F, the upper portion of the flange is compressed by the lower face of the reservoir and moves away from the axis of the stud 17. This situation is illustrated in FIG. 3b. This upper portion of the flange 40 offers resistance to the pressure exerted on the reservoir from the top toward the bottom. In the situation illustrated in FIG. 3b, the pin 3 can be inserted in the holes 12, 21 and 13 as previously described. When the pressure on the reservoir is released, the flange 40, due to its elasticity, pushes the reservoir upward in the direction of the arrow F and the pin is confined in the wider sections 14 and 15 according to the situation illustrated in FIG. 2c.

In a variant embodiment not illustrated in the figures, the sleeves, such as the sleeve 4, can be fitted into the master cylinder inlets 27 and 28. The reservoir outlets 31 and 32 are designed to be placed in these sleeves. As previously, during the fitting of the reservoir on the master cylinder, the upper portion of the flange 40 of each sleeve is compressed by the lower face of the reservoir and moves away from the axis of the corresponding outlet 31, 32.

The upper portion of the flange 40 offers resistance to the pressure exerted on the reservoir from the top toward the bottom and when the pressure on the reservoir is released, the flange 40, due to its elasticity, pushes the reservoir upward in the direction of the arrow F and a pin placed in the holes 12, 13, 21 is confined in the wider sections 14 and 15.

In this variant embodiment, the studs 17 and 17' of the reservoir and the blind holes 24 and 24' provided in the master cylinder and designed to receive the studs 17 and 17' are not required.

The invention claimed is:

1. A brake fluid reservoir comprising at least two lateral mounting lugs (10, 11) designed to be placed either side of a central mounting lug (20) of a support device, the said lugs including two collinear holes (12, 13) designed to receive a mounting pin (3) itself designed to pass through the lateral lugs (10, 11) and the central lug (20) of the support device, the said lugs including at least one device for the axial immobilization of the mounting pin (3), characterized in that the holes (12, 13) in the lateral lugs (10, 11) include wider sections (14, 15) located on the side of the faces of the lateral lugs which are designed to be in contact with the central lug of the support device, the said wider sections being designed to confine a mounting pin placed in the said holes.

2. A brake fluid reservoir according to claim 1, characterized in that it includes a spring device pressing both on a lower face of the reservoir and designed to press on an upper face of the support device, so as to move the reservoir away from the brake master cylinder in a direction of movement (F) and in that the pin (3) placed in the said holes (12, 13) is designed to have its ends (30, 31) placed inside the wider sections (14, 15).

3. A brake fluid reservoir according to claim 2, characterized in that the depth (P1, P2) of the wider sections measured along the axis of the holes (12, 13) is such that the sum of the wider sections in the two lateral lugs plus the distance between these two lateral lugs is greater than the length (L) of the pin (3).

4. A brake fluid reservoir according to claim 3, characterized in that each wider section is located at least on the side opposite to the direction of movement (F) in relation to the axis of the holes (12, 13).

5. A brake fluid reservoir according to claim 2, characterized in that the spring device includes a spring washer (4) placed between the reservoir and the support part.

6. A brake fluid reservoir according to claim 2, characterized in that the reservoir includes a stud (17) located under the lower face (18) of the reservoir and going into a hole (24) in the support part and in that the washer (4) includes a sleeve (41) placed around the stud, the said sleeve ending in a deformable elastic flange located in contact with the lower face of the reservoir.

7. A brake apparatus comprising a brake master cylinder having a longitudinal axis and including an upper portion and, on the upper portion, a central mounting lug located on the longitudinal axis, and a brake fluid reservoir including at least two lateral mounting lugs (10, 11) on either side of the central mounting lug (20) of the master cylinder, the lateral lugs having faces in contact with the central lug of the master cylinder, the lateral lugs including two collinear holes (12, 13) receiving a mounting pin (3) passing through the lateral lugs (10, 11) and the central lug (20) of the master cylinder, and the lateral lugs including at least one device for the axial immobilization of the mounting pin (3), characterized in that the holes (12, 13) in the lateral lugs (10, 11) include wider sections (14, 15) located on the side of the faces of the lateral lugs which are in contact with the central lug of the master cylinder, the wider sections confining the mounting pin in the holes.

8. A brake apparatus according to claim 7, including a spring device pressing both on a lower face of the reservoir and on an upper face of the master cylinder, so as to move the reservoir away from the master cylinder in a direction of movement (F), wherein the pin (3) has ends (30, 31) inside the wider sections (14, 15).

9. A brake apparatus according to claim 8, wherein the wider sections have a depth (P1, P2) measured along the axis of the holes (12, 13), the depth being such that the sum of the wider sections in the two lateral lugs plus the distance between these two lateral lugs is greater than the length (L) of the pin (3).

10. A brake apparatus according to claim 9, wherein each wider section is located at least on the side opposite to the direction of movement (F) in relation to the axis of the holes (12, 13).

11. A brake apparatus according to claim 8, wherein the spring device includes a spring washer (4) between the reservoir and the master cylinder.

12. A brake apparatus according to claim 8, wherein the reservoir includes a stud (17) located under the lower face (18) of the reservoir and going into a hole (24) in the master cylinder, and wherein the washer (4) includes a sleeve (41) around the stud, the sleeve ending in a deformable elastic flange located in contact with the lower face of the reservoir.

13. A mounting device for mounting a brake fluid reservoir on a support device, the mounting device comprising at least two lateral mounting lugs (10, 11) designed to be placed either side of a central mounting lug (20) of the support device, the said lugs including two collinear holes (12, 13) designed to receive a mounting pin (3) itself designed to pass through the lateral lugs (10, 11) and the central lug (20) of the support device, the said lugs including at least one device for the axial immobilization of the mounting pin (3), characterized in that the holes (12, 13) in the lateral lugs (10, 11) include wider sections (14, 15) located on the side of the faces of the lateral lugs which are designed to be in contact with the central lug of the support device, the said wider sections being designed to confine a mounting pin placed in the said holes.

14. Mounting device according to claim 13, characterized in that it includes a spring device pressing both on a lower face of the reservoir and designed to press on an upper face of the support device, so as to move the reservoir away from the brake master cylinder in a direction of movement (F) and in that the pin (3) placed in the said holes (12, 13) is designed to have its ends (30, 31) placed inside the wider sections (14, 15).

15. Mounting device according to claim 14, characterized in that the depth (P1, P2) of the wider sections measured along the axis of the holes (12, 13) is such that the sum of the wider sections in the two lateral lugs plus the distance between these two lateral lugs is greater than the length (L) of the pin (3).

16. Mounting device according to claim 15, characterized in that each wider section is located at least on the side opposite to the direction of movement (F) in relation to the axis of the holes (12, 13).

17. Mounting device according to claim 14, characterized in that the spring device includes a spring washer (4) placed between the reservoir and the support part.

18. Mounting device according to claim 14, characterized in that the reservoir includes a stud (17) located under the lower face (18) of the reservoir and going into a hole (24) in the support part and in that the washer (4) includes a sleeve (41) placed around the stud, the said sleeve ending in a deformable elastic flange located in contact with the lower face of the reservoir.

* * * * *